Feb. 16, 1937.            S. BALLANTINE            2,070,640
                   MEANS FOR AND METHOD OF DETECTION
                      Filed April 10, 1929        2 Sheets-Sheet 1
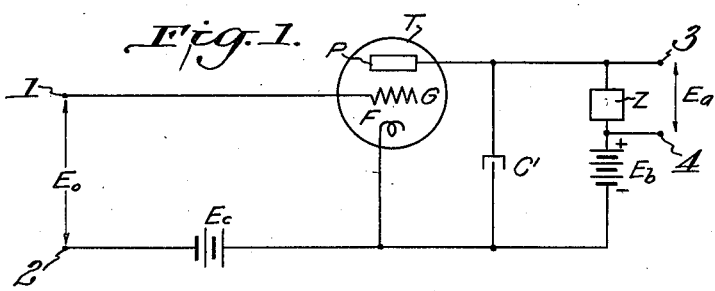
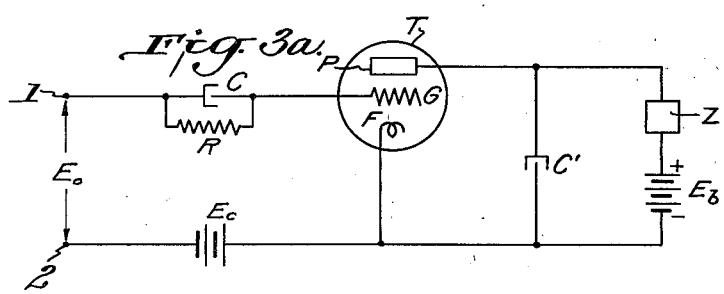
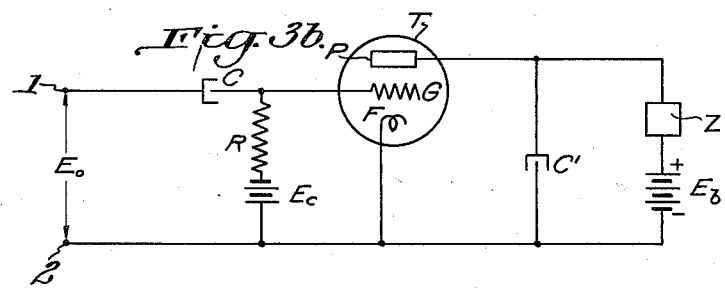
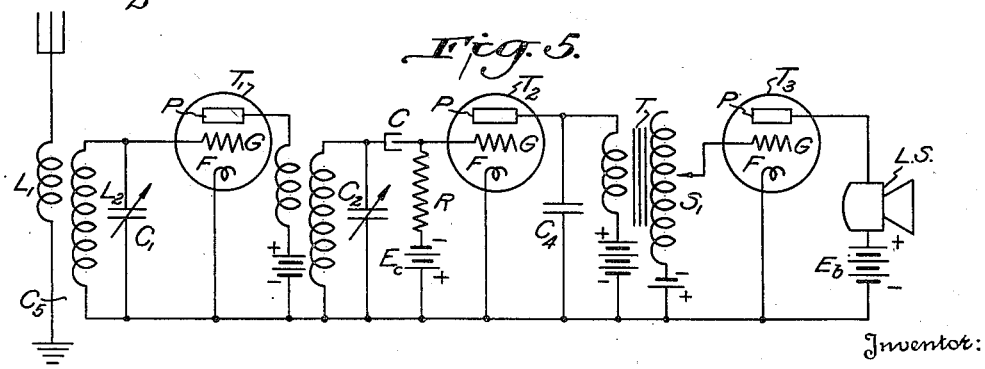
Inventor:
Stuart Ballantine,
By Byrnes Townsend & Potter,
                    Attorneys.

Patented Feb. 16, 1937

2,070,640

UNITED STATES PATENT OFFICE 2,070,640

MEANS FOR AND METHOD OF DETECTION

Stuart Ballantine, Boonton, N. J., assignor, by mesne assignments, to Radio Corporation of America, New York, N. Y., a corporation of Delaware Application April 10, 1929, Serial No. 354,022

30 Claims. (Cl. 250—27)

This invention relates to an electrical circuit for radio reception in association with audion tubes, and more particularly to a new and improved form of detector circuit and method of detection. An object of the present invention is to provide a detector and method of detection in which the response in the form of audio frequency output voltage bears an approximately linear relation to the input in the form of radio frequency carrier-wave voltage. A further object is to provide such a detector and method of detection in which this region of approximately linear response extends over wider limits of carrier voltage than has hitherto been the case, and in which distortion is consequently reduced or eliminated over a wider operating range. A still further object of the invention is to accomplish the foregoing results through the combination of an automatic grid-biasing means with a detector having a region of approximately linear response in such a way as to extend the limits of said region. A still further object of the present invention is to provide certain novel arrangements of detector circuits and certain novel method of detection for accomplishing the foregoing results. Other objects of the invention will appear from the following description.

Figure 2:
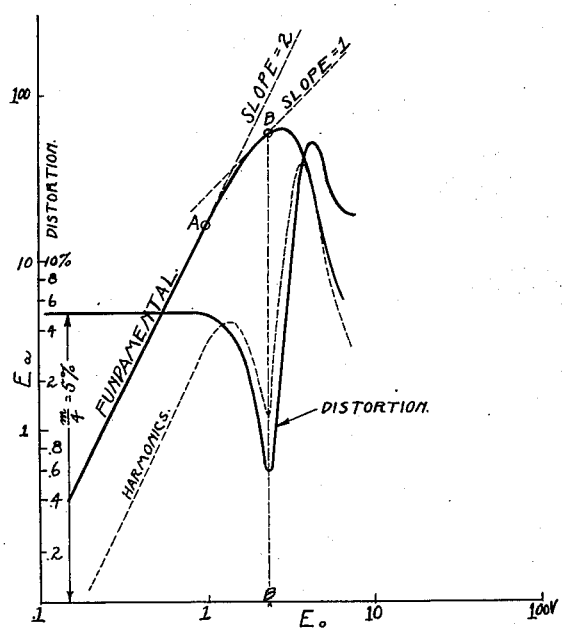
Figure 4:
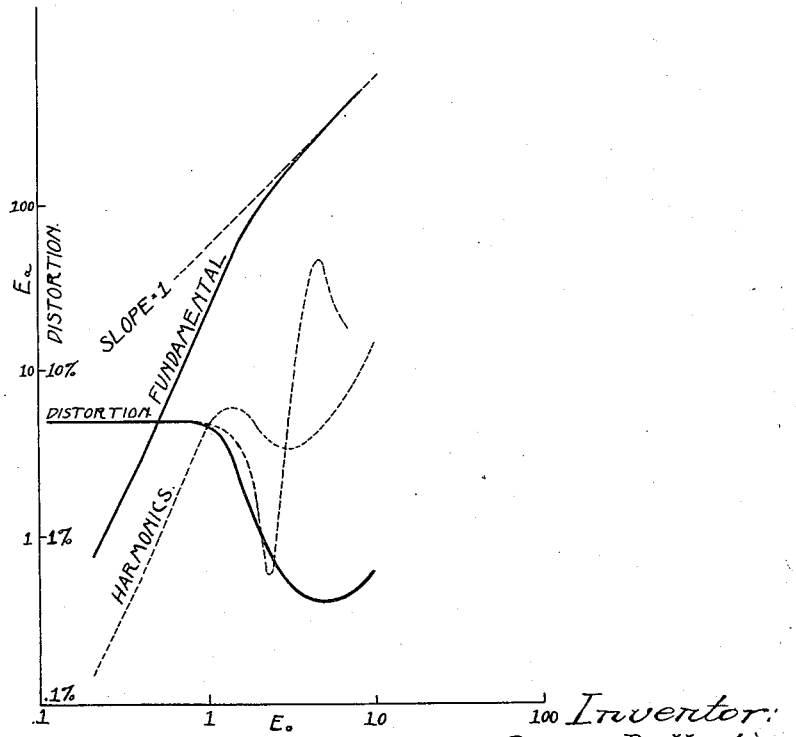

The invention will hereafter be described in connection with the accompanying drawings in which Figure 1 is a diagram which will be used in the explanation of the invention; Figure 2 shows a number of curves which will be similarly used; Figures 3a, 3b and Figure 5 are diagrams showing examples of certain embodiments of the present invention; and Figure 4 shows curves indicating the operation of the embodiments shown in Figs. 3a and 3b.

Referring now to Figure 1, T represents a vacuum tube of the three-element type provided with anode or plate P, and a control element or grid G. The numerals 1 and 2 represent the output terminals of a signal amplifier; at 3 and 4 are terminals across which is the output audio frequency voltage $E^a$; and F is the electron emitting cathode element. The latter may, of course, as is now well understood, be of either the direct current or alternating current filamentary type, or may be of the indirectly heated or so-called "heater" type. This vacuum tube is arranged for plate rectification through the provision of an audio frequency impedance Z in the plate circuit, which may for example be connected in series with the plate potential source $E_b$, a radio frequency by-pass condenser $C'$ connected between the plate and the filament system, and a grid-biasing potential source represented by the battery $E_c$, whereby the tube may be adjusted so as to operate on the desired portion of the plate current-grid voltage characteristic. In such an arrangement if a modulated radio frequency signal of the carrier-wave symmetrical side-band type, which may be represented by:

$$e = E_0(1 + m \sin at) \sin wt$$

where
$E_0$ = impressed radio frequency carrier voltage.
$m$ = coefficient of modulation
$a$ = frequency of audio modulation
$w$ = angular velocity of the radio frequency current is impressed upon the input terminals 1 and 2, as indicated, and the output audio frequency voltage across the impedance Z is observed and plotted as ordinates against the radio frequency carrier voltage $E_0$ as abscissae, a curve similar to that marked "Fundamental" in Figure 2 is obtained. The particular curve marked "Fundamental" shown in Figure 2 was plotted from actual experimental data obtained with a vacuum tube of the 201—A type, using logarithmic coordinates. When the impressed radio frequency carrier voltage $E_0$ is small the detector operates on the curved portion of the plate current characteristic, and the response, as determined by audio frequency output voltage, is proportional to the square of the impressed carrier voltage. Thus, referring to the curve marked "Fundamental" in Figure 2, up as far as the point marked A, the slope is equal to 2, indicating a square-law response on this logarithmic scale.

In the prior art the detector has been operated at low signal voltages. In the conventional broadcast receiver comprising a grid-rectifying detector succeeded by a two stage audio amplifier, the normal output, as defined by the Standardization Committee of the Institute of Radio Engineers, is 20 volts across a resistance of 5000 ohms in the plate circuit of the output tube. For a "mu" of 5 and internal resistance of 5000 ohms in this tube this would correspond to 8 volts on the grid, and for an amplification of about 25 per stage this would correspond to 8/625 or 0.013 volts audio on the detector grid. If the average modulation is 25% the corresponding radio frequency carrier voltage would be about 0.23 volt. This is well within the small signal region in which the detector responds according to the square-law. It is also to be noted that in a conventional receiver of this type it will not be possible to get out of the square-law region because with this amount of audio amplification the output tube will overload before the carrier voltage on the detector grid has increased sufficiently to do so. In order to get out of this region it is generally necessary to reduce the audio amplification, for example, by removing one audio stage, as hereinafter described.

The disadvantages of such square-law detection have been discussed in U. S. Patent No. 1,698,668, issued January 8, 1929 to Ballantine and Hull. Briefly with a modulated carrier-wave signal of the type $e = E_0(1+F(t)) \sin wt$ the output of such a detector contains not only a term proportional to $F(t)$ as it should, but also a second order $F^2(t)$ term which is superfluous and represents distortion. If $F(t)$ is of the form $m \sin at$ where $m$ is the degree of modulation (0 to 1.0, or 0 to 100%), the distortion will be represented by a second harmonic, or double frequency term. If we define the "distortion" as the ratio:

$$\text{Dist.} = \sqrt{\frac{E_2^2 + E_3^2 + \ldots E_n^2}{E_1}}$$

where $E_n$ represents the amplitude of the nth harmonic and $E_1$ is the amplitude of the fundamental the distortion in the case of square-law detection with the above modulation is equal to $m/4$. In order to keep down this distortion the degree of modulation $m$ must be limited, that is $m$ should be kept small compared with unity. This is uneconomical and wasteful of power in the carrier, and limits the service area of a given broadcast transmitter for fixed interference production by the carrier. In the early days of broadcast transmission the transmitters were seldom capable of greater than 50% modulation. In English speech the ratio of the peak voltage to the average voltage is about 5, hence if the peaks are limited to 50% the average modulation will be about 10%. With such low modulation the distortion might not be noticeable, and this would account for the complacent attitude with which the process of square-law detection has been viewed by experts in the prior art. With 100% modulation, however, these detectors are not satisfactory because the distortion is too great. I have therefore sought a detector which will respond, not as the square but as the first power of the applied voltage, in order to provide satisfactory reception with complete (100%) modulation.

In the previous patent to Ballantine and Hull, cited above, it is shown how with a rectifier which has an E—I characteristic comprising two slightly curved branches meeting in a section of greater curvature, an approximation to linear detection can be achieved by increasing the signal voltage applied to the device. In the present case of a thermionic device we do not have two nearly straight branches, but we do have at least one perfectly straight branch, i. e. the part of the curve of zero current along the axis for retarding fluids. I have discovered that with such a device, having at least one straight branch the response approaches linearity as the signal voltage is increased and more of the straight portion is utilized during the cycle.

The experimental proof of this is contained in Fig. 2. As the applied carrier voltage is increased beyond the region in which the detection is according to the square-law, that is, beyond the point A, the slope of the response curves gradually decreases until at the point B the slope of the curve is unity, indicating linear response. I propose to take advantage of this discovery and amplify and adjust the signal voltage so that operation takes place at this point, thereby obtaining minimum distortion.

In making the foregoing curves a modulation of 20% was employed, and it will be seen that for small signal voltages the distortion approaches $$\frac{m}{4} = 5\%$$

as shown at the left-hand end of the curve marked "distortion". As $E_0$ increases, however, the distortion diminishes when the exponent in the law of response stated above begins to decrease from 2 to 1. Thus at the voltage $E_0$ shown at B, at which point the response is linear, the distortion is a minimum, and is seen to have decreased from 5% to .57%. For higher values of impressed carrier voltage than those indicated at B, i. e. in the region of overloading, the distortion increases rapidly, and attains values which are in fact much higher than the distortion for small signals, the maximum value of the distortion curve in Figure 2 being 50%.

There is no practical difficulty in adjusting the signal to the optimum point B by manual control; nevertheless it is desirable in apparatus designed for commercial use to make the adjustment for linearity as easy as possible. I have devised two methods for accomplishing this. In the first method the carrier voltage is maintained at its optimum value over a wide range of field strength variations by means of an automatic volume control such as that described in copending U. S. application, Ser. No. 231,273, filed November 5, 1927. In the second method a manual control is employed and the adjustment is facilitated by extending the range of carrier voltage over which the response of the detector is approximately linear.

I have found that the range of linear response can be extended by combining with the plate-rectifying detector an automatic grid bias whereby the averaged D. C. potential of the control grid is automatically made more negative with respect to the cathode as the carrier voltage increases. The necessary biasing potential may be derived from the detector circuits themselves by arrangements which will be described in this application, or may be derived from a separate element or tube.

In Figures 3a and 3b, I have illustrated two examples of suitable circuit arrangements and methods whereby the desired automatic grid-bias may be produced in a detector of the type described above. In these arrangements, the desired variation of the grid-bias is produced by means of a direct current potential which is developed in the detector by means of grid rectification, although the detecting action as regards the signal is produced by operation of the tube upon the curved portion of its plate current characteristic. The by-pass condenser C in Figures 3a and 3b is made so large and its audio-frequency impedance so small that a negligible audio or modulation frequency voltage is developed across it, and hence no signal detection is produced in the grid circuit. The relation between the automatic grid bias and the voltage of the impressed carrier wave may be adjusted over wide limits by means of the resistance R, and by varying the grid biasing voltage $E_c$. By this means, the negative bias of the grid is automatically increased with increasing applied signal voltage. It is to be noted that in this arrangement, the condenser C is made of large capacity, for example, of the order of 1 microfarad, so as to substantially suppress all grid circuit rectification for the modulation or audio frequency, while at the same time offering a substantial impedance to direct current and thereby providing the desired automatic grid-biasing. Such an arrangement is of course to be distinguished from the commonly employed grid circuit detectors, in which the grid condenser is very much smaller (of the order of 1/1000th), a voltage by modulation frequency is developed across the grid, and the operation is entirely different.

Figures 3a and 3b illustrate two examples of suitable arrangements for producing the desired automatic grid-bias, but it is obvious that the elements C and R of these arrangements may be replaced by other forms of filter network which offer a large impedance for zero frequency but have negligible impedance at modulation frequencies.

The operation of arrangements such as those shown in Figures 3a and 3b is illustrated by the curves given in Figure 4. From the curve marked "Fundamental" it is seen that the region of approximately linear response is greatly extended, in this particular case, the slope of the curve being equal to 1 for impressed carrier voltages between approximately 2.8 and 10 volts. Throughout this entire region, the distortion is correspondingly reduced, and is less than approximately 0.6%.

Fig. 5 shows a practical radio broadcast receiver embodying these ideas. Since relatively high-voltages are to be applied to the detector, there is no audio amplifier stage intermediate to the detector and power tube. The radio frequency amplifier is represented by a single triode stage; this is symbolic only. $L_1$ $L_2$ represent the input transformer tuned by the condenser $C_1$; $T_2$ is the detector tube arranged for plate rectification and is here shown as a triode; $C_4$ is a by-pass condenser for radio-frequency currents; T is an audio frequency transformer; $T_3$ is a power tube which supplies power to the electrophone LS. The circuit arrangement for obtaining the desired automatic grid bias in the detector stage is of the type shown in Fig. 3b and includes a source of relatively fixed bias voltage $E_c$ and a biasing resistance R connected between the control grid and cathode, the resistance R being effectively shunted by the condenser C which has a negligible impedance for modulation frequencies.

The circuit arrangements herein described show certain embodiments of my invention and certain methods of operation for the purpose of explaining its principle and showing its application, but it is obvious to those skilled in the art that there is a great variety of arrangements which may be employed for producing the desired result and I aim therefore to cover all such modifications and variations.

I claim:

1. In the operation of a vacuum tube detector, the method of extending the range of linear response which comprises energizing the elements of said detector by direct current potentials effective to secure plate circuit rectification, and including in the grid circuit only an impedance of a magnitude producing grid rectification of carrier voltage without grid circuit rectification of modulation frequencies, whereby the grid bias is automatically varied in accordance with carrier voltage.

2. A radio receiving system comprising a detector of the thermionic type containing a cathode and a grid, means for automatically altering the average potential of the grid negatively as the carrier voltage increases, said means comprising an element in series with the grid and having high impedance to steady currents and low impedance to carrier and modulation frequencies, a resistance having one end connected between the series element and the grid, a source of direct current potential connected between the other end of said resistance and the cathode, means for amplifying the received signal voltages, and means for impressing the amplified voltages upon the grid of the detector.

3. A radio receiving system comprising a detector of the thermionic type containing a control grid, a resonant input circuit, means for automatically increasing the average potential of the grid negatively as the carrier voltage increases, said means comprising a path which includes a resistance and a serially-connected condenser and which is shunted across the input circuit, said condenser being designed to offer low reaction to the carrier and modulation frequencies, a connection from between said resistance and condenser to the control grid, means for amplifying the received signal voltages, and means for impressing said amplified voltages upon said detector.

4. A radio receiving system according to claim 3 wherein the shunt path across the input circuit has included a source of direct current potential.

5. In a system for the transmission of modulated carrier waves, a thermionic detector of the plate circuit rectification type, and means included only in the grid circuit of said detector for increasing the control grid bias on said detector negatively as the carrier voltage increases.

6. The invention as set forth in claim 5, wherein said means comprises an impedance which prevents grid rectification of carrier and modulation frequencies while presenting a high impedance to steady currents.

7. The invention as set forth in claim 5, wherein said means comprises an impedance having a low impedance for carrier and modulation frequencies and a high impedance for steady currents.

8. In a system of carrier wave transmission, a detector having electrodes constituting terminals of an input circuit of said detector, and means for automatically varying the average direct current voltage between said electrodes as the carrier voltage increases, said means comprising a serially-connected element which is included only in said circuit and which presents a high impedance to steady currents and a low impedance to carrier and modulation frequencies.

9. A detector for a modulated carrier wave transmission system, said detector comprising a thermionic tube including a plate, a control grid and a cathode, a circuit connecting the plate and cathode and including an output impedance, a resistance and a condenser shunting the resistance and offering low impedance to carrier and modulation frequencies, a connection between the grid of said detector and one terminal of said resistance, a connection from the other terminal of said resistance to the input circuit of said detector, and a connection from the other terminal of said input circuit to the cathode of said thermionic tube, said last-named connection including a source of potential for applying a fixed bias voltage to said grid.

10. The method of automatically varying the ratio of audio frequency output voltage to impressed carrier voltage of a plate circuit rectifier in accordance with changes in the magnitude of received signal energy, which comprises developing in the grid circuit only of said rectifier a rectified carrier voltage which is substantially independent of the degree of modulation of received signals, and impressing said rectified voltage upon the control grid of said rectifier.

11. The method of automatically varying the ratio of audio frequency output voltage to impressed carrier voltage of a plate circuit rectifier in accordance with changes in the magnitude of received signal energy, which comprises developing a rectified carrier voltage in the grid circuit only of said rectifier, and impressing said rectified voltage upon the control grid of said rectifier.

12. In the operation of a detector having an input and an output circuit, the method of deferring overload with increasing signal strength which comprises effecting rectification of received signals in one circuit of said detector, preventing rectification of carrier and modulation frequencies in the other circuit while establishing only in said other circuit a high impedance to steady currents, thereby to automatically vary an energizing potential in said other circuit in accordance with the magnitude of received signal energy.

13. In the art of detecting radio-frequency signal energy by a detector tube in whose anode circuit radio-frequency energy is rectified, the method which comprises impressing radio-frequency energy upon the input circuit of the detector tube, deriving from said radio-frequency signaling energy a uni-directional current in the grid circuit only of said tube, operating upon said uni-directional current in the grid circuit of said tube to produce a substantially direct current, and utilizing said substantially direct current to effect a substantially constant negative bias of the grid of said tube of substantial magnitude dependent upon the amplitude of said radio-frequency signal energy.

14. In combination, an electron discharge detector having an anode, a cathode and a grid, means for impressing signal modulated high frequency oscillations on said grid, an output circuit connected between the anode and cathode, means to impress a constant negative bias potential on said grid to reduce the anode current substantially to the cut-off value whereby the intensity of the detected output signal currents varies in a substantially linear relation with the intensity of the impressed high frequency oscillations, and means included in the grid circuit only for supplying to said grid an additional negative bias potential varying responsively to the intensity of the supplied high frequency oscillations in such a way that said linear relation between the intensity of said output signal currents and the impressed oscillations is maintained while the grid swing of said discharge device is increased.

15. In combination a thermionic tube having anode and cathode and grid, said tube being operatively arranged between input and output circuits, means applying a negative potential to said grid for normally adjusting the space current of said tube of a value near zero whereby said tube operates as a detector of impressed signals, and impedance means included only in said input circuit responsive to the flow of grid current during reception of intense signals for automatically applying to said grid an additional negative biasing potential sufficient to prevent the grid being carried appreciably positive by said signals whereby detection thereof is accomplished almost entirely at negative grid potentials with minimum distortion and at substantially constant output levels for impressed signals at high intensity.

16. In combination a thermionic tube having anode, cathode and grid, said tube being operatively arranged between input and output circuits, means applying a negative biasing potential to said grid for normally adjusting the space current of said tube to a value near zero whereby said tube operates as a detector of impressed signals, and impedance means comprising resistance shunted by capacity included only in said input circuit responsive to the flow of grid current during reception of intense signals for applying to said grid an additional negative biasing potential sufficient to prevent the grid being carried appreciably positive by said intense signals whereby detection thereof is accomplished almost entirely at negative grid potentials with minimum distortion and at substantially constant output levels for impressed signals sufficiently intense to carry said grid positive.

17. In combination a thermionic tube including anode, cathode and grid, said tube being operatively arranged between input and output circuits and having a substantially linear grid voltage—space current characteristic at negative grid potential less than the cut-off value, means applying a negative potential to said grid for normally adjusting the space current of said tube to a value near zero whereby said tube operates as a linear detector of impressed signals, and impedance means included only in said input circuit responsive to the flow of grid current during reception of intense signals for automatically applying to said grid an additional negative biasing potential proportioned to prevent the grid being carried appreciably positive by said signals, whereby detection thereof is accomplished almost entirely at negative grid potentials with minimum distortion and at substantially constant output levels for impressed signals sufficiently intense to carry said grid positive.

18. In combination a thermionic tube having anode, cathode and grid, said tube being operatively arranged between input and output circuits and having a substantially linear grid voltage—space current characteristic at negative grid potentials, means applying a negative biasing potential to said grid for normally adjusting the space current to a value near zero whereby said tube operates as a linear detector of impressed signals, and impedance means comprising resistance shunted by capacity included only in said input circuit responsive to the flow of grid current therein during reception of intense signals for automatically applying to said grid an additional negative biasing potential proportioned to prevent the grid being carried appreciably positive by said signals, whereby detection thereof is accomplished almost entirely at negative grid potentials with minimum of distortion and at substantially constant output levels for impressed signals sufficiently intense to carry said grid positive.

19. In combination a thermionic tube having anode, cathode and grid, said tube being operatively arranged between input and output circuits and having a substantially linear grid voltage—space current tube characteristic extending between the cut-off and saturation limits thereof, means applying a negative biasing potential to said grid for normally adjusting the space current to a value near zero whereby said tube functions as a linear detector of impressed signals, and impedance means included only in said input circuit responsive to the flow of grid current during reception of intense signals for automatically applying to said grid an additional negative biasing potential proportioned to prevent the resultant potential of said grid being carried positive appreciably beyond said saturation limit by said intense signals whereby detection thereof is accomplished almost wholly within the linear portion of said tube characteristic with minimum distortion and at substantially constant output levels for signals sufficiently intense to carry the resultant instantaneous grid potential positive beyond said saturation limit.

20. In combination a thermionic tube having anode, cathode and grid, said tube being operatively arranged between input and output circuits and having a substantially linear grid voltage—space current tube characteristic extending between the cut-off and saturation limits thereof, means applying a negative biasing potential of said grid for normally adjusting the space current to a value near zero whereby said tube functions as a linear detector of impressed signals, and impedance means comprising resistance shunted by capacity included only in said input circuit responsive to the flow of grid current during reception of intense signals for automatically applying to said grid an additional negative potential proportioned to prevent the resultant potential of said grid being carried positive appreciably beyond said saturation limit by said intense signals whereby detection thereof is accomplished almost wholly within the linear portion of said tube characteristic with minimum distortion and at substantially constant output levels for signals sufficiently intense to carry the resultant grid potential positive beyond said saturation limit.

21. A combination in accordance with claim 20 wherein said capacity shunting said resistance is sufficiently large to have an inappreciable effect upon the tuned frequency of said tunable circuit.

22. A combination in accordance with claim 16 wherein said resistance and shunt capacity have a time constant slightly greater than the lowest audible frequency to be received.

23. In combination, a thermionic tube having anode, cathode and grid, said tube being operatively arranged between input and output circuits and having a substantially linear grid voltage—space current characteristic at negative grid potentials, means applying a negative biasing potential to said grid for normally adjusting the space current to a value near zero whereby said tube operates as a linear detector of impressed signals, and impedance means comprising resistance shunted by capacity included only in said input circuit responsive to the flow of grid current therein during reception of intense signals for automatically applying to said grid an additional negative biasing potential such that the positive envelope of a modulated carrier wave impressed upon said input circuit is adjusted within the linear portion of said tube characteristic whereby said wave is detected with minimum distortion.

24. The method of preventing slumping of the radio-input-audio-output characteristic of a detector tube operating to effect anode circuit rectification, which comprises impressing radio-frequency signal energy upon the detector input circuit, producing in the grid circuit of said tube, independently of the anode current, a uni-directional current derived from said radio-frequency signal energy, and producing by said unidirectional current a negative grid-biasing voltage solely in the grid circuit and of substantially constant and appreciable magnitude dependent upon the amplitude of said radio-frequency signal energy.

25. The method of preventing slumping of the radio-input-audio-output characteristic of a detector tube, which comprises impressing modulated radio-frequency energy upon the detector input circuit, producing by grid-circuit rectification of said radio-frequency energy flow of uni-directional current in the grid circuit of said tube, producing by said uni-directional current a negative grid-biasing voltage solely in the grid circuit and of substantially constant and appreciable magnitude dependent upon the amplitude of said radio-frequency energy, and producing by anode circuit rectification flow of current varying in accordance with the modulations of said radio-frequency energy.

26. In radio receiving apparatus utilizing a tunable radio-frequency circuit in advance of a detector tube, the method of ensuring maximum audio-response when said circuit is tuned to the received radio-frequency signal energy, which comprises producing by grid-circuit rectification of signal energy impressed upon the detector input circuit uni-directional current in the grid circuit of said tube, and producing by said current negative grid-biasing voltage solely in the grid circuit and of substantially constant and substantial magnitude dependent upon the amplitude of said energy, and producing by anode circuit rectification current varying in accordance with the modulations of said radio-frequency energy.

27. In radio receiving apparatus having a detector tube utilizing anode circuit rectification and having means to control volume of reproduction by changing the amplitude of radio-frequency energy impressed upon the detector input circuit, the method of ensuring that adjustment of the volume control in a given sense always effects change of volume in the same sense, which comprises producing by grid-circuit rectification of signal energy impressed upon the detector input circuit uni-directional current in the grid circuit of said tube, and producing by said current a negative grid biasing voltage solely in the grid circuit and of substantially constant and appreciable magnitude dependent upon the amplitude of said energy.

28. Radio receiving apparatus comprising a detector having a radio-frequency input circuit, means for impressing modulated radio-frequency energy upon said input circuit, and a combination of resistance and capacity solely in said input circuit and having a time constant greater than the period of the lowest frequency of modulation of the impressed radio-frequency energy.

29. Radio receiving apparatus comprising a detector operating to effect anode circuit rectification, means adjustable for regulating the amplitude of signal energy impressed upon the detector input circuit, and means for ensuring that the amplitude of the detector output energy varies in magnitude in the same sense as the impressed input energy when said means is adjusted comprising a capacity solely in said input circuit in a path in shunt to a high resistance.

30. Radio receiving apparatus comprising a detector tube having an input circuit and effecting plate-circuit rectification of modulated radio-frequency energy impressed on said input circuit, and means for preventing slumping of the radio-input audio-output characteristic of said tube comprising a network of resistance and capacity solely in said input circuit for deriving directly from the radio-frequency energy by grid-circuit rectification a substantial negative grid-biasing potential of magnitude determined by the amplitude of the radio-frequency energy, and having a time-constant greater than the period of the lowest frequency of modulation of said radio-frequency energy.

STUART BALLANTINE.